United States Patent [19]
Thompson

[11] Patent Number: 4,814,005
[45] Date of Patent: Mar. 21, 1989

[54] FLUX MATERIAL FOR STEELMAKING

[76] Inventor: Jeffery Thompson, 3059 Old Stone Dr., Birmingham, Ala. 35243

[21] Appl. No.: 44,326

[22] Filed: Apr. 30, 1987

Related U.S. Application Data

[63] Continuation-in-part of Ser. No. 873,170, Jun. 10, 1986.

[51] Int. Cl.$^4$ .............................................. C21C 7/00
[52] U.S. Cl. ............................................ 75/24; 75/3; 75/53; 75/38; 75/257
[58] Field of Search ..................... 75/3, 53, 58, 24, 257

[56]  References Cited

U.S. PATENT DOCUMENTS

| | | | |
|---|---|---|---|
| 2,308,984 | 1/1943 | Kraner | 75/54 |
| 3,313,617 | 4/1967 | Ban et al. | 75/5 |
| 3,519,386 | 7/1970 | Fedock et al. | 75/257 |
| 3,726,665 | 4/1973 | Minnick | 75/30 |
| 3,926,616 | 12/1975 | Imperato | 75/3 |
| 4,003,736 | 1/1977 | Kreiger | 75/3 |
| 4,093,448 | 6/1978 | Eliseer | 75/3 |
| 4,336,218 | 6/1982 | Kaas et al. | 264/111 |

FOREIGN PATENT DOCUMENTS 1193391 5/1970 United Kingdom .

Primary Examiner—Peter D. Rosenberg
Attorney, Agent, or Firm—Cushman Darby Cushman

[57]  ABSTRACT

A fused, hardened composition containing CaO, MgO and $Al_2O_3$ for use in purifying molten metal during steel production and a method of making the same. The composition can be made up of electric arc furnace dust and lime or dolo-lime fines which would normally be wasted. The mixture of ingredients is hydrated, molded into a uniform size and carbonated using a $CO_2$ containing gas and then heated so as to produce a molded non-dusting composition which dissolves quickly and uniformly in the slag process. Components such as PbO from the furnace dust which normally make slag a hazardous waste under environmental regulations, are reacted within the molded composition to form stable ceramic spinels. These spinels are not water soluble and therefore not subject to strict disposal requirements.

8 Claims, No Drawings

FLUX MATERIAL FOR STEELMAKING

RELATED APPLICATIONS

This invention is a continuation-in-part of my previous application Ser. No. 873,170, filed June 10, 1986, titled New Design for Lime Kilns, the complete disclosure of which is hereby fully incorporated by reference.

BACKGROUND OF THE INVENTION

Lime, primarily CaO, and dolo-lime, primarily CaO.MgO, are added to steel making vessels (electric arc furnaces, basic oxygen furnace (BOF) and Q-BOP, etc.) to form a complex melt of oxides, ordinarily called "slag," for the purpose of absorbing undesired impurities from the hot metal bath of molten iron. Slag in the steel making process is a mixture of CaO, $Al_2O_3$, $SiO_2$, MgO, and other mineral substances in small amounts including sulfur, and phosphorous, The silica, $SiO_2$, sulfur, and phosphorous are the major impurities of the hot metal bath that the slag is intended to remove, or absorb.

The steel making operation entails melting scrap metal, and/or using molten iron and defining the melt to the desired chemistry to make steel products. The materials added to the steel making vessel are often termed "the charge", and adding materials to the vessel is called "charging". Lime and dolo-lime (and in some melt shops, bauxite) are part of the charge. As the melt is formed, the heat is melted in, or "formed up", the liquid metal bath is covered over by a lower density melt of mineral substances, the slag. Obtaining a well mixed, uniform slag is an important first step in the steel making process.

Charging lime and dolo-lime pebbles to the vessel has two inherent problems. The clean oxides of lime, CaO, and dolo-lime, CaO.MgO, are not easily wetted, and additionally, a layer or shell of calcium silicates forms on the lime pebble which retards the dissolution of CaO and MgO into the slag. The steel making process is not started until the slag is formed up because it is the CaO that acts as the primary absorbent of the impurities. The MgO is added to balance the chemistry of the slag with the refractory lining of the vessel. Without MgO in the slag it will chemically attack the refractory lining until the slag reaches chemical equilibrium with the lining. Adding MgO brings the slag into equilibrium with the refractory and extends refractory life. The MgO also has its own role in removing impurities from the metal. Thus, the time required for making up the slag, dissolving the CaO and MgO, is an essential first step in steel making, but it is also an irrecoverable loss of production time.

$Al_2O_3$, along with CaO and MgO, is an essential constituent of any melt additive since these materials are most effective for removing impurities from the hot metal bath.

The second major problem is that lime and dolo-lime are made from limestone, calcitic and dolomitic, respectively, which are extracted from the ground by normal quarrying and/or mining processes. As a result, the limestone is produced in a range of sized and shaped pieces, from dust to boulders. The boulders can be broken down but the dust has, until this invention, been difficult to coalesce or aggregate. While the limestone is relatively hard, heating the limestone, $CaCO_3$, is calcine it into CaO (with the $CO_2$ driven off) yields lime which is soft and crumbles easily. Both the quarrying process and calcination step combine to produce a product with a considerable size distribution. When lime (and dolo-lime) are charged to the steel making vessel, the fine fraction and dust which are readily air-borne, are lost to the exhaust fan system of the vessel. Because the limestone quarrying and lime production steps are variable, the mix of sizes in the lime charge is a random variable. The variability of the lime charge is a serious problem for the melt shop. A charge of 140 pounds of lime per ton of hot metal to one heat may actually net 135 pounds of lime in the vessel per tone of hot metal. But the next lime charge for the next heat may be comprised of a larger portion of fines and dust with only a net of 125 pounds of lime in the vessel per tone of hot metal. The removal of silica and sulfur from the hot metal are sensitive to the portion of lime present, hence, the lime dust and fines that are lost are of no use and the variability of size distribution of the lime becomes a contributor to variability in the quality of the steel produced.

In many instances the problem is further complicated by the fact that the dolo-lime is structurally weaker than the high calcium lime. This results in a larger portion of the Dolo-lime being lost as fines and dust than for the high calcium lime.

Steel making operations, electric arc furnaces in particular, produce dust materials which are collected in control devices, usually baghouses. Scrap iron used for steelmaking often includes electric wiring components that contain solder, copper, etc., and "tin plate" which contains zinc. In the intense heat and high temperatures of the electric arc, several of the low melting point metals are vaporized: zinc, lead, and copper. The metal fume is oxidized as it condenses and escapes from the area of the arc. The electric arc furnace dust, or fume, owing to its soluble lead oxide content is a US EPA listed hazardous waste. The 1984 Amendments to RCRA (Resource Conservation and Recovery Act) have imposed an August 1988 deadline for a land ban to the disposal of electric arc furnace dust in any landfill. The complete electric arc furnace dust contains $Fe_2O_3$, ZnO, CaO, $Al_2O_3$, MgO, MnO, $SiO_2$, CuO, PbO, and other substances in small amounts. The CaO and MgO are fines and dust losses from the line and dolo-lime charge. Thus, it would be advantageous to be able to recycle such dust rather than dispose of it.

Additionally, the lime producer is constrained by the portion of fines and dust that can be removed or screened from the material that is shipped to the steel melt shops. Limestone fines, usually that stone fraction which will pass a screen in the range of 3/16 to ½ inch, is not used as feed to the lime kilns. The limestone fines are sold, if possible, as aggregate at a low price merely to get rid of the material. Having to remove the fines and dust from the finished product is yet another problem that only erodes the net yield of the line plant. Some lime producers manufacture and sell enough hydrate (calcium hydroxide) that they can use most of the lime fines as feed to the hydrator. However most plants need to be able to ship the fines along with the pebble lime to the steel melt shops.

OBJECTS OF THE INVENTION

It is therefore an object of the invention to provide a flux material for steelmaking which is easily wetted when introduced into the slag.

It is a further object of the invention to provide such a flux comprising high-strength, substantially uniform sized particles to eliminate dust losses during the addition of the flux material to the slag.

It is yet another object of the invention to utilize lime fines and electric arc furnace dust as components of the flux, which materials have previously been wasted.

BACKGROUND ART

A composite of lime and calcium ferrite, $CaFe_2O_4$, has been produced as a fused flux material for steel making by several lime companies for many years. This product is manufactured by combining limestone and an iron source, usually mill scale, as a feed to a rotary kiln. This process has also been combined with bauxite included in the feed.

The production of lime/calcium ferrite does not solve any of the problems of size distribution of the lime product, utilization of the quarried and/or mined limestone, nor that of the disposal problems for electric arc furnace dust, EAFD.

SUMMARY OF THE INVENTION

According to the invention, a shaped, sintered and/or fused composition is provided comprising a mixture of CaO, $Al_2O_3$ and MgO useful as a supplement and/or replacement for pebble lime in steel melt shops.

In accordance with one embodiment of the invention, the fused composition additionally comprises electric arc furnace dust, calcinic or dolomitic limestone fines, and similar components.

In a preferred embodiment of the invention, the shaped, fused composition comprises about 5–90 wt % CaO, about 7–1 wt % MgO and about 0.5–54 wt % $Al_2O_3$.

Further, according to the invention, a process is provided for producing shaped, sintered and/or fused compositions which comprises (1) hydrating a mixture comprising CaO, $Al_2O_3$ and MgO, (2) forming the hydrated mixture of (1) into shaped objects, and (3) hardening the shaped objects of (2) by subjecting same to carbonation.

In another embodiment of the process of the invention, the carbonated, shaped objects are heated at an elevated temperature and for a period of time sufficient to fuse the components into a matrix and to react potentially hazardous components such as PbO to form stable ceramic spinels.

In accordance with still another embodiment of the invention, fused, hardened, shaped compositions comprising CaO, $Al_2O_3$ and MgO of the invention are used for purifying molten metal during steelmaking operations.

DETAILED DESCRIPTION OF THE INVENTION

It has now been found that a composition of limestone fines, lime fines, dolomitic limestone fines, dolo-lime fines, bauxite, electric arc furnace dust, hydrate "rejects" and other mill wastes such as mill scale, mill scale pit sludges, blast furnace scrubber sludges, etc., can be combined into a mix and pressed in molds or shaped as by briquetting, extrusion, etc. If a minimum of lime is included in the mix, i.e., 5 to 105 by weight, and the mix is wetted to facilitate pressing, the lime fraction will hydrate and be finely dispersed in the matrix of molded material between the limestone grains. The matrix is comprised of the bauxite, electric arc furnace dust, and hydrate (calcium hydroxide, and/or hydrated dolo-lime which yields $Ca(OH)_2$ and $Mg(OH)_2$).

After pressing or briquetting, in this invention, the briquettes are exposed to $CO_2$ gas, most easily accomplished in a lime plant by the use of the exhaust gas from a lime kiln which is usually about 30 to 35% $CO_2$ (by weight). The lime and hydrates in the briquette react with the $CO_2$ to form calcite, $CaCO_3$, limestone and magnasite, $MgCO_3$. An identical parallel set of reactions occur with magnesium hydroxide. The result is a briquette with exceptional strength. Green (as pressed) briquettes, without a binder, may have crushing strengths in the range of 50 to 250 psi. With this process, the as-pressed briquettes, after an approximately one hour exposure to exhaust gas from a lime kiln, had improved crushing strengths ranging from 1500 to 6000 psi. Such a briquette now has the mechanical strength to withstand the loads that are encountered in a lime kiln.

The briquette is then added to the sized limestone feed to any lime kiln.

This utilization of limestone fines in a briquetted form makes it possible for the average lime plant to increase their quarry yield (ratio of quarried tons per ton of product) from about 3 to 1.78, the theoretical limit, i.e., 100 % utilization of the quarried stone into a high value added product.

In the lime kiln, the limestone fraction of the briquette is calcined to lime, and the matrix fuses around the grains. The fused matrix incorporates the metal oxides of lead and zinc, PbO and ZnO from the electric arc furnace dust, into a complex of $CaO$-$Fe_2O_3$-$Al_2O_3MgO$, rendering the lead relatively insoluble. The fused briquette is then sent to the steel melt shop as the CaO/flux material for the steel making process.

The fused briquettes is significantly stronger than pebble lime or dolo-lime thus it does not crumble and break apart in shipment and material handling steps between the lime plant and the melt shop. The fused briquette is made in uniformed, controlled size pieces, resulting in a uniform, predictable charge to the steel making vessel. Moreover, the briquette can be produced with any desired $CaO/MgO/Al_2O_3$ ratio that the melt shop wants.

In the steel making vessel the materials of the briquette form the slag rather than separate charges of lime, dolo-lime and bauxite. Because the fused briquette incorporates CaO and MgO as fused oxide complexes, consistent with the slag chemistry and the included lime and dolo-lime grains are small sized, the briquette goes into solution and makes up the complete slag much more rapidly than pebble lime, dolo-lime and bauxite. At the end of the heat the slag is disposed of in the usual manner. Because slag is a complex of oxides, the PbO and ZnO from the electric arc furnace dust are chemically combined in relatively insoluble spinels.

Lead oxides are used in ceramic glazes for the decoration of dishes where preventing the leaching of Pb into food is essential. It has long been known that the materials which best reduce the solubility of PbO are (in order of decreasing effectiveness): $SiO_2$, $Al_2O_3$, CaO, ZnO, $Fe_2O_3$, and MgO, i.e., the ingredients of slag.

In the most preferred embodiment, the present invention is a partially fused and/or sintered briquette which is made in three steps: mixing limestone fines, dolomitic limestone fines, lime fines, dolo-lime fines, electric arc furnace dust, bauxite, and other suitable materials which may include mill wastes such as mill scale, mill scale pit sludges, blast furnace scrubber sludges, BOF baghouse dust, "red mud," etc., where the mixture is then wetted to hydrate the CaO and MgO present in the mix, and provide enough free moisture to facilitate briquetting. BOF baghouse dust is mainly composed of $Fe_2O_3$, CaO and $SiO_2$. Red mud is a 10-20% solid containing slurry waste stream from alumina extraction of bauxite consisting of $Al_2O_3$ and its hydrates, as well as minor amounts of $Fe_2O_3$, $SiO_2$, $CoCO_3$, $MgCO_3$ and water saturated with NaOH.

The second step is to press the mixture into briquettes and expose the pressed briquettes to a $CO_2$ rich gas. The third step is to heat the briquettes in a suitable device.

The preferred composition will contain at least 5% (by weight) free lime, CaO, and/or MgO (as dolo-lime) in the mixture of ingredients. The ratio of matrix material or ultra-fines (electric arc furnace dust, hydrate, and bauxite) to grains or grit (material retained on a 16 Mesh screen, largely limestone, and dolomitic limestone fines) can range from 0.04 to 0.95, by weight, of the mix. From the perspective of the melt shops, a balance of 2 parts electric furnace dust, 1 part bauxite, 6 parts limestone fines, 2 parts dolomitic limestone fines, and 1 part lime (or dolo-lime) fines, is close to the average chemistry desired for the slag. This gives the matrix a chemical composition of 385 CaO, 23% $Al_2O_3$, 175 $Fe_2O_3$, 11% ZnO, 3% MgO, 2% PbO, and 6% others (a combination of $SiO_2$, CuO, MnO, S, $P_2O_5$, etc.). The fired briquette then has a final composition of 675 CaO, 10% $Al_2O_3$, 8% $Fe_2O_3$, 75 MgO, 5% ZnO, 1% PbO, and 3% others (as listed above).

The useful range of the invention at the low end of the spectrum in terms of free CaO in the matrix was found to be a mix with a composition of 18% CaO, 5% $Al_2O_3$, 385 $Fe_2O_3$, 23% ZnO, 55 MgO, 2% PbO, and 85 others (a combination of $SiO_2$, CuO, MnO, S, $P_2O_5$, etc.). This matrix mix was combined with various amounts of limestone fines, with the ratio of matrix material to limestone fines and/or dolomitic limestone fines, ranging from 0.3 to 2. It was found that suitable briquettes could be produced with a range of final chemistries from 35.5% CaO, 5% $Al_2O_3$, 305 $Fe_2O_3$, 17.6% ZnO, 4.5% MgO, 2.4% PbO, and 6% others (a combination of $SiO_2$, CuO, MnO, S, $P_2O_5$, etc.); to 67% CaO, 2.5% $Al_2O_3$, 15% $Fe_2O_3$, 8.6% ZnO, 2% MgO, 1% PbO, and 3% others (a combination of $SiO_2$, CuO, MnO, S, $P_2O_5$, etc.). Also at the low end of the spectrum of free CaO in the matrix, bauxite could be used instead of electric arc furnace dust. This set of samples had a matrix chemical composition of 16% CaO, 67% $Al_2O_3$, 8% $Fe_2O_3$, 6% MgO, and 3% others. The range of chemistries for suitable briquettes then was from 33% CaO, 54% $Al_2O_3$, 6% $Fe_2O_3$, 5% MgO, and 2% others; to 65% CaO, 27% $Al_2O_3$, 4% $Fe_2O_3$, 3% MgO and 1% others.

The useful range of the invention at the high end of the spectrum in terms of free CaO in the matrix was found to be a mix with a composition of 82% CaO, 1% $Al_2O_3$, 8% $Fe_2O_3$, 3% ZnO, 1% MgO, 0.4% PbO, and 4% others (a combination of $SiO_2$, CuO, MnO, S, $P_2O_5$, etc.). This matrix mix was combined with various amounts of limestone fines, with the ratio of matrix material to limestone fines and/or dolomitic limestone fines, ranging from 0.3 to 2. It was found that suitable briquettes could be produced with a range of final chemistries from 90% CaO, 0.5% $Al_2O_3$, 35 $Fe_2O_3$, 25 ZnO, 2% MgO, 0.3% PbO, and 2% others (a combination of $SiO_2$, CuO, MnO, S, $P_2O_5$, etc.); to 85% CaO, 1% $Al_2O_3$, 6% $Fe_2O_3$, 4% ZnO, 1% MgO, 0.6% PbO, and 2.4% others (a combination of $SiO_2$, CuO, MnO, S, $P_2O_5$, etc.). Also at the high end of the spectrum of free CaO in the matrix, bauxite could be used instead of electric arc furnace dust. This set of samples had a matrix chemical composition of 73% CaO, 17% $Al_2O_3$, 5% $Fe_2O_3$, 2% MgO, and 3% others. The range of chemistries for suitable briquettes then ran from 78% CaO, 11% $Al_2O_3$, 3% $Fe_2O_3$, 4% MgO, and 35 others; to 89% CaO, 5% $Al_2O_3$, 1% $Fe_2O_3$, 2% MgO, and 3% others.

The initial ingredients are mixed and water is added to hydrate all of the CaO and MgO present in the ingredients with enough water to have about 10% free moisture remaining. The free moisture is useful in the briquetting operation. The free moisture should be limited so that free liquid water is not pressed out of the briquetting equipment, at this point in the process the lead oxide, or hydroxide, is still soluble and any run-off will be toxic, hazardous waste due to the lead content.

The mixture is then briquetted or otherwise pressed into shapes. A pressure of about 6000 psi to about 8000 psi provides adequate compaction of the mix. Pressures beyond 8000 psi do increase the density of the as-pressed briquette, but relative to the benefit obtained, the amount of work required and the increase in the roll wear of the briquetting press due to high pressures is not justified. However, pressures below 6000 psi greatly reduce the as-pressed strength and density of the green briquette.

Any $CO_2$ source may be used for hardening the briquettes. In a lime plant the most obvious and convenient source is the lime kiln exhaust gas which typically is 25 to 35 % $CO_2$. Exposures of 2 hours to the lime kiln exhaust gases are adequate to harden the briquettes to an average of about 1000 psi compressive strength. Longer exposures are not detrimental, it merely requires a larger holding tank for the briquettes. Exposures of 8 hours have produced briquettes with 7000 psi compressive strengths. The increase in strength from 1000 to 7000 psi is not commensurate with the cost of doing so.

The $CO_2$ hardened briquettes are charged to a lime kiln (or dolo-lime kiln) along with some portion of sized limestone. The ratio of brightness to limestone is whatever suits the material balance of the lime plant.

In the kiln it is essential that the processing temperature reach a minimum of about 1180° C. From a practical standpoint, slightly higher temperatures of 1210° to 1230° C. for a minimum of 1 hour are adequate to fuse the electric arc furnace dust into the matrix in a 1" diameter, 2" long cylinder. Larger briquettes obviously must be heated longer, smaller briquettes can be processed in shorter periods of time. The temperature is the critical dimensions, the time requirement merely allows the briquette to be heated to temperature all the way through. An upper limit of about 1400° C. should be observed to prevent the loss of PbO to the kiln gases.

As a result of the use of this invention the electric arc furnace dust is returned to the furnace and melted into the slag where it is rendered acceptable for ordinary disposal. The steel melt shop is able to realize a higher utilization of the CaO, $Al_2O_3$, MgO it purchases as flux materials, and more consistent and predictable slag chemistry. This invention also improves the production capacity of a given furnace in that less time for each heat is required to form up or melt in the slag.

The use of electric arc furnace dust in this invention will allow the melt shop to change the classification of the dust to a commodity rather than a US EPA listed hazardous waste.

The use of this invention will make it possible for a lime plant to increase its quarry utilization from (a national average) about 70% to 100%; for the same annular production of lime the quarrying operation can be reduced by 30S. This obviously extends the projected life of a limestone ore body by one-third.

What is claimed is:

1. A method of producing a molded, hardened mixture for use as a slag forming material in steelmaking, said method comprising the steps of:
   (a) forming an intimate mixture of limestone and a matrix forming material comprising CaO, MgO, $Al_2O_3$ and $Fe_2O_3$ and hydrating the mixture;
   (b) pressing the hydrated mixture into shaped objects;
   (c) carbonating the shaped objects to bind the limestone fines together; and
   (d) heating the carbonated, shaped objects at a temperature in for a period of time sufficient to fuse said matrix forming materials into a matrix.

2. Method as in claim 1 wherein said matrix forming material consists of electric arc furnace dust.

3. Method as in claim 1 wherein said matrix forming material comprises red mud.

4. Method as in claim 1 wherein said matrix forming material comprises BOF dust.

5. Method as in claim 1 wherein said intimate mixture is hydrated so as to contain about 10% free water by weight.

6. Method as in claim 1 wherein the hydrated mixture is carbonated until the mixture reaches a hardness of 1000 psi or greater.

7. Method as in claim 1 wherein the carbonated mixture is heated at a temperature of from about 1180° C. to about 1400° C.

8. Method of claim 1 wherein said pressing occurs at a pressure of from about 6000 to about 8000 psi.

* * * * *